(12) United States Patent
Iwasaki et al.

(10) Patent No.: US 7,108,932 B2
(45) Date of Patent: Sep. 19, 2006

(54) FUEL CELL SYSTEM

(75) Inventors: Yasukazu Iwasaki, Yokohama (JP); Naoki Hara, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 588 days.

(21) Appl. No.: 10/067,812

(22) Filed: Feb. 8, 2002

(65) Prior Publication Data

US 2002/0114988 A1  Aug. 22, 2002

(30) Foreign Application Priority Data

Feb. 21, 2001 (JP) ............... 2001-044676

(51) Int. Cl.
*H01M 8/04* (2006.01)

(52) U.S. Cl. ............... 429/17; 429/19; 429/22; 429/34

(58) Field of Classification Search .......... 429/19, 429/17, 22, 34
See application file for complete search history.

(56) References Cited

U.S. PATENT DOCUMENTS

| | | | | |
|---|---|---|---|---|
| 4,365,006 A | * | 12/1982 | Baker ............... | 429/17 |
| 4,585,708 A | * | 4/1986 | Abens et al. ............... | 429/17 |
| 4,588,659 A | * | 5/1986 | Abens et al. ............... | 429/20 |
| 4,859,545 A | * | 8/1989 | Scheffler et al. ............... | 429/17 |
| 5,747,185 A | * | 5/1998 | Hsu ............... | 429/44 |
| 5,981,096 A | | 11/1999 | Hornburg et al. | |
| 6,045,933 A | * | 4/2000 | Okamoto ............... | 429/17 |
| 6,083,637 A | * | 7/2000 | Walz et al. ............... | 429/17 |
| 6,136,462 A | | 10/2000 | Kriechbaum et al. | |

FOREIGN PATENT DOCUMENTS

| | | |
|---|---|---|
| JP | 58-133774 A | 8/1983 |
| JP | 59-105274 A | 6/1984 |
| JP | 60-051605 A | 3/1985 |
| JP | 61-185872 A | 8/1986 |
| JP | 1-241760 A | 9/1989 |
| JP | 03-216966 A | 9/1991 |
| JP | 2000-058091 A | 2/2000 |
| JP | 2000-100462 | 4/2000 |
| JP | 2000-191304 A | 7/2000 |

* cited by examiner

*Primary Examiner*—Patrick Joseph Ryan
*Assistant Examiner*—Julian Mercado
(74) *Attorney, Agent, or Firm*—Foley & Lardner LLP

(57) ABSTRACT

A fuel cell system includes a fuel cell (9), an exhaust gas circulation passage (10) which circulates part of the exhaust gas from the fuel cell (9) back to the fuel cell (9), a fuel injector (3) which injects liquid fuel into the circulated exhaust gas, and a vaporizer (4) which vaporizes the injected fuel. The fuel cell system has a high response, as the liquid fuel injected into the exhaust gas rapidly vaporizes.

12 Claims, 8 Drawing Sheets

FUEL CELL SYSTEM

FIELD OF THE INVENTION

This invention relates to a fuel cell system wherein power is generated using the fuel gas generated from liquid fuel.

BACKGROUND OF THE INVENTION

JP-A-2000-100462 published by the Japanese Patent Office in 2000 discloses a technique wherein liquid fuel is sent to an evaporator according to the load of a fuel cell, and the liquid fuel is vaporized and supplied to a reformer. In the reformer, part or all of the hydrocarbon fuel is reformed into hydrogen according to the following equations (1) and (2).

$$C_nH_{2n+2} + nH_2O \rightarrow nCO + (n+2)H_2 \quad (1)$$

$$CO + H_2O \rightarrow CO_2 + H_2 \quad (2)$$

The hydrogen obtained by reforming is supplied to the anode of a fuel cell.

SUMMARY OF THE INVENTION

However, when fuel is vaporized in the evaporator and fuel gas is supplied to the reformer in this way, a sufficient response is not necessarily obtained in a system where the fuel cell has a large load fluctuation such as an automobile. Moreover, when the system is stopped, evaporation of the liquid fuel in the evaporator cannot be stopped immediately. Further, caulking (plugging of the evaporator) easily occurs due to the fuel remaining within the evaporator, degrades the performance of the evaporator, and causes the efficiency of the system to decline.

It is therefore an object of this invention to improve the response of the system to load fluctuation in a fuel cell system using liquid fuel. It is a further object of this invention to prevent the caulking of the vaporizer.

In order to achieve above object, this invention provides a fuel cell system, comprising a fuel cell, an exhaust gas circulation passage which circulates part of the exhaust gas from the fuel cell back to the fuel cell, a fuel injection mechanism which injects liquid fuel into the circulated exhaust gas, and a vaporizer which vaporizes the injected fuel.

The details as well as other features and advantages of this invention are set forth in the remainder of the specification and are shown in the accompanying drawings.

DESCRIPTION OF THE PREFERRED EMBODIMENTS

Figure 1:
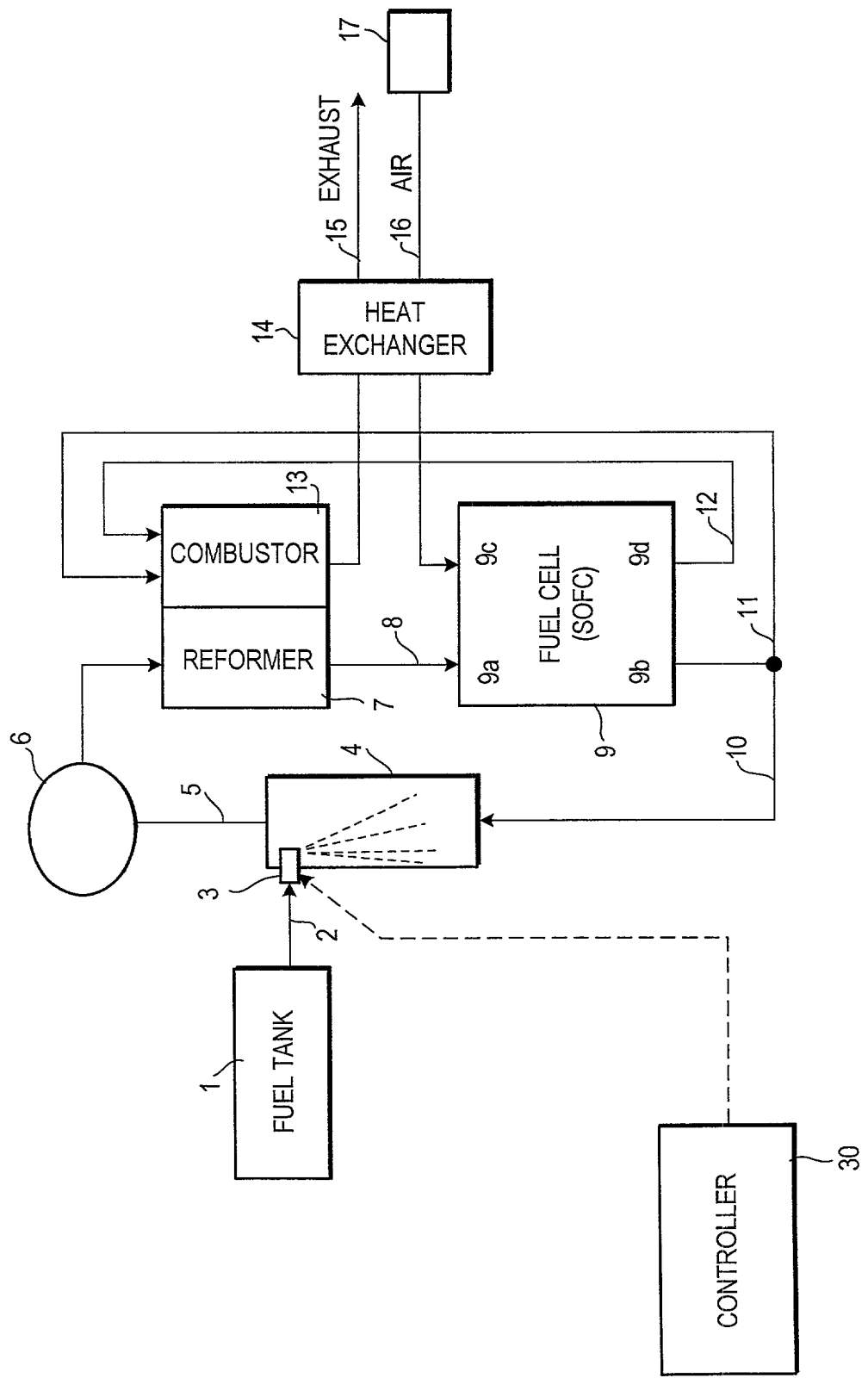
FIG. 1 is a schematic flow diagram of a fuel cell system according to this invention.

Referring to FIG. 1 of the drawings, a fuel cell system comprises an oxygen ion conduction type solid oxide fuel cell (SOEC) 9 which generates power using hydrogen or a hydrocarbon as a fuel. The fuel cell 9 uses a hydrocarbon liquid fuel like gasoline as the fuel, part of the exhaust gas of the fuel cell 9 being circulated to an anode inlet port 9a via a vaporizer 4.

The supply fuel is stored in a fuel tank 1 in a liquid state, supplied to an injector 3 via a fuel supply passage 2, and is injected into the vaporizer 4. The injector 3 is controlled by a controller 30 which comprises one, two or more microprocessors, a memory and an I/O interface.

Some of the anode exhaust gas from an anode outlet 9b is circulated to the vaporizer 4 via an anode exhaust gas circulation passage 10. In the vaporizer 4, the circulated anode exhaust gas is mixed with fuel injected from the injector 3. The fuel is vaporized, becomes mixed fuel gas, and is supplied to a reformer 7 via a fuel gas supply passage 5 and a circulation blower 6.

In general, in a solid oxide fuel cell used for this fuel cell system, the temperature of the anode exhaust gas is as high as 800–1000° C., so the liquid fuel injected into the anode exhaust gas rapidly vaporizes. Thus, the fuel cell system has a high response. Moreover, as liquid fuel does not directly adhere to the wall of the vaporizer 4, caulking by the liquid fuel (plugging of the vaporizer 4 by the remaining fuel) can be prevented, and decrease in performance of the vaporizer 4 can be prevented.

Moreover, as the temperature of the mixed fuel gas is lower than that of the circulated anode exhaust gas due to vaporization, high temperature fuel or steam does not flow to the circulation blower 6, and an improvement in reliability of the circulation blower 6 may thus also be expected.

In the case of steam reforming, the temperature of the reformer 7 tends to fall due to the endothermic reaction, but reforming can be made to proceed efficiently by using the heat of the combustor 13 which mixes the cathode exhaust gas and anode exhaust gas, and burns them. The fuel gas which is reformed, is supplied to the anode inlet port 9a via a fuel gas supply passage 8 and used for power generation, and unused gas and steam generated by power generation are discharged from the anode outlet 9b as anode exhaust gas.

Air is supplied via an air passage 16 from an air feeder 17 which comprises a blower or a compressor, heated in a heat exchanger 14 for preheating by heat exchange with exhaust gas 15 from the combustor 13, supplied to a cathode inlet port 9c of the fuel cell 9, and used for power generation. The air which was not used is discharged from a cathode outlet 9d. The cathode exhaust gas discharged from the cathode outlet 9d is supplied to the combustor 13 via a cathode exhaust gas passage 12, burnt together with that part of the anode exhaust gas from the anode outlet 9b which was not circulated, and discharged as exhaust gas.

Figure 2:
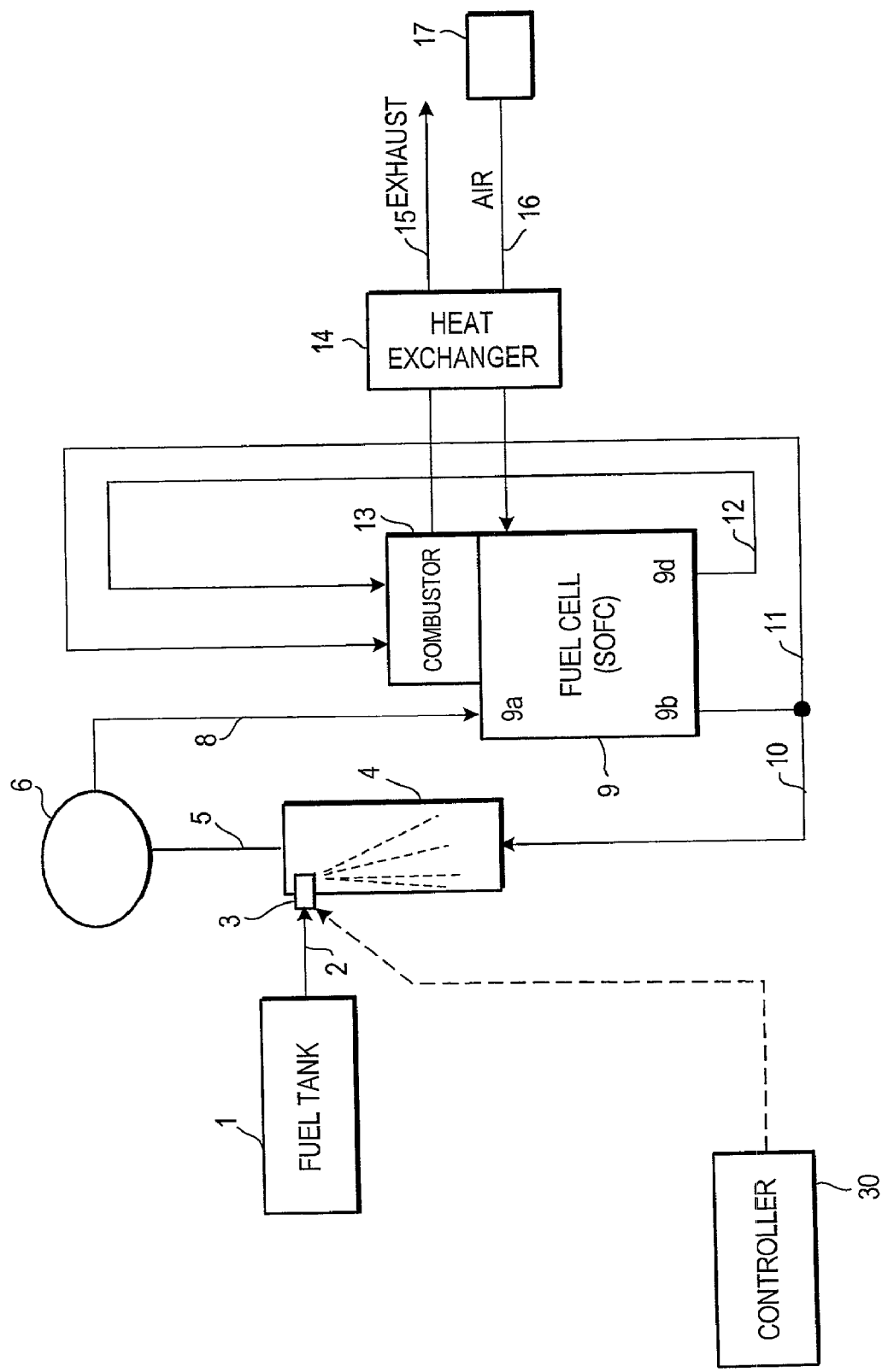
FIG. 2 is similar to FIG. 1, but showing a second embodiment of this invention.

FIG. 2 shows a second embodiment of this invention.

In this embodiment, the fuel stored in the fuel tank 1 in the liquid state is supplied to the fuel cell 9 by spraying from the injector 3 and mixing with the circulated anode exhaust gas which is part of the anode exhaust gas from the anode outlet 9*b* as in the first embodiment.

In this embodiment, the fuel cell 9 is an internal reforming type wherein fuel reforming is performed inside the fuel cell 9, and the circulated exhaust gas and fuel gas which were mixed in the vaporizer 4 are directly supplied to the fuel cell fuel gas inlet port 9*a* via the circulation blower 6. Although the heat of the fuel cell is taken up by the reforming reaction in the case of an internal reforming type fuel cell, the heat can be supplemented by the combustor 13 which burns the anode exhaust gas and cathode exhaust gas.

Figure 3:
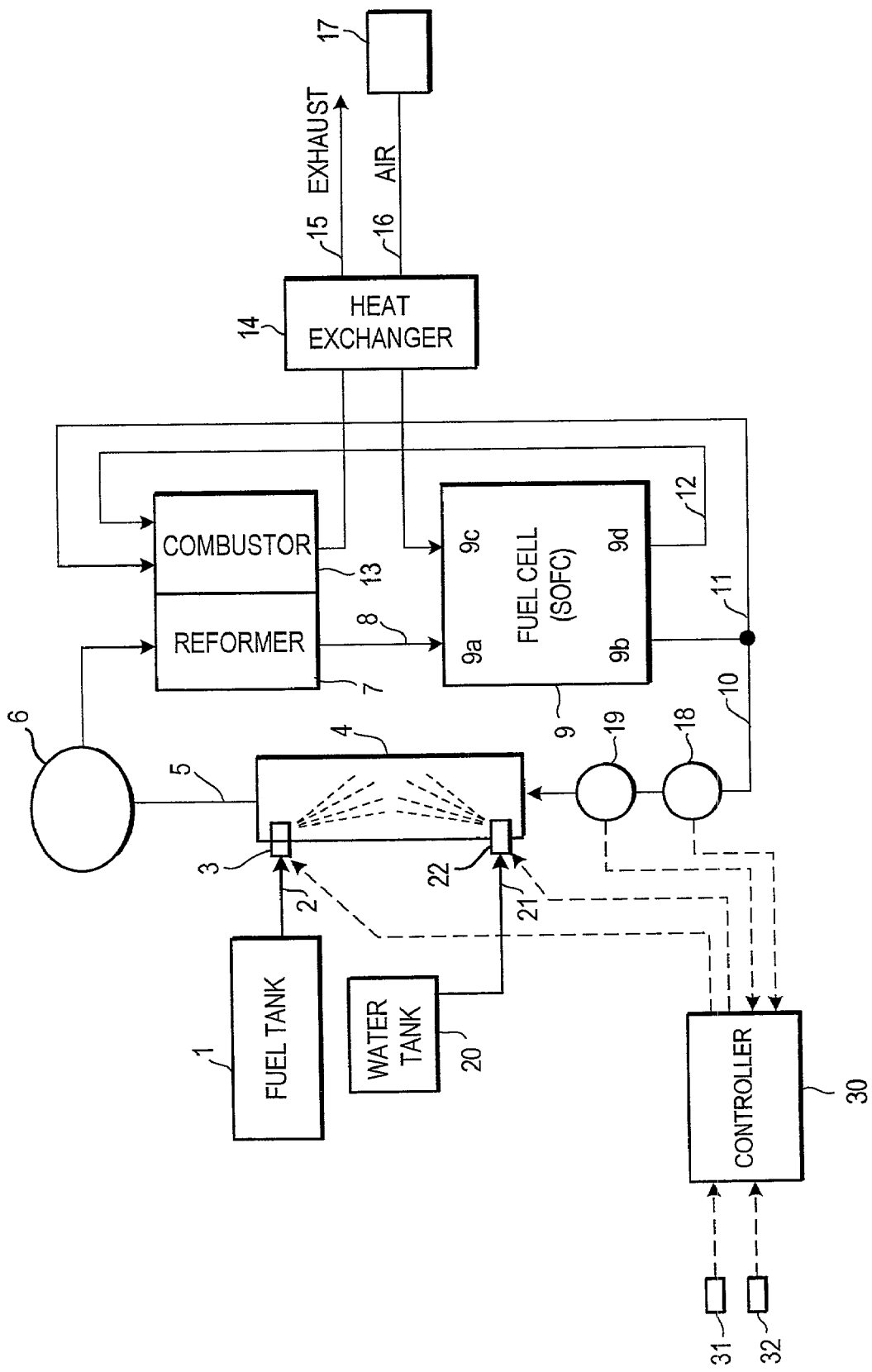
FIG. 3 is similar to FIG. 1, but showing a third embodiment of this invention.

FIG. 3 shows a third embodiment of this invention.

In this embodiment, in a fuel cell system identical to that of the first embodiment, a water feeder (water tank 20, water supply passage 21 and injector 22) is added to the vaporizer 4. Further, a steam amount (mol/sec) and fuel amount in the circulated anode exhaust gas supplied to the vaporizer 4 via the anode exhaust gas circulation passage 10 are detected respectively by a differential pressure type steam flowrate sensor 18 and fuel component sensor 19 comprising an optical humidity sensor.

Specifically, the water stored in the water tank 20 is supplied to the injector 22 via the water supply passage 21, and is injected into the vaporizer 4 from the injector 22.

Of the anode exhaust gas from the anode outlet 9*b*, anode exhaust gas circulated via the anode exhaust gas circulation passage 10 is supplied to the vaporizer 4, and the fuel injected from the injector 3, water injected from the injector 22 and circulated anode exhaust gas are mixed in the vaporizer 4. Some of the injected water takes some of the heat from the circulated anode exhaust gas when it is vaporized, but not so much as to prevent vaporization of the fuel spray.

Even if some water remains, it evaporates and does not cause the caulking problem, so it is sufficient if the vaporizer 4 has a structure wherein the sprayed fuel does not accumulate and can be vaporized. For example, the vaporizer 4 may house steel balls which withstand the temperature of the exhaust gas of the anode or cathode, and are reduction-proof. Moreover, the injector 22 is installed upstream of the injector 3 as the latent heat of water is higher than that of a hydrocarbon liquid fuel such as gasoline, and the vaporization of water before Liquid fuel permits the water to be vaporized stably.

The mixed fuel gas mixed in the vaporizer 4 is supplied to the reformer 7 via the fuel gas supply passage 5 and the circulation blower 6. As the temperature of the mixed fuel gas is lower than that of the circulated anode exhaust gas due to vaporization of the supplied fuel and water, high temperature fuel or steam does not flow into the circulation blower 6. The fuel gas which is reformed is supplied to the anode inlet port 9*a* via the fuel gas supply passage 8 and is used for power generation, while unused fuel gas and steam generated by power generation are discharged from the anode outlet 9*b* as anode exhaust gas.

The amount of fuel used by the fuel cell 9, which corresponds to the output load of the fuel cell, can be computed uniquely from the power generation reaction equation. However, actually, a larger amount of fuel than the amount of fuel calculated by the reaction equation must be supplied, so in general, unused fuel components are contained in the anode exhaust gas which is discharged from the anode outlet 9*b*.

Hence, in this embodiment, the amount of unused fuel in the circulated anode exhaust gas is measured by the fuel component sensor 19, and any insufficiency based on the required fuel supply amount calculated from the load of the fuel cell 9 is injected from the injector 3. In this way, the usage efficiency of the fuel can be improved without circulating excess fuel. Moreover, plugging of piping by circulation of excess fuel can also be prevented.

In order to reform hydrocarbon liquid fuels such as gasoline, an amount of steam according to the amount of fuel which is reformed, is required. For this purpose, the amount of steam contained in the circulated anode exhaust gas is measured by the steam flowrate sensor 18, and control is performed so that the injector 22 injects any insufficiency of steam required for the reformer 7 to efficiently carry out reforming. Due to this control, steam reforming of fuel can be performed efficiently. Thus, the response and efficiency of the fuel cell system can be increased by controlling the fuel and water supply amounts according to the load of the fuel cell 9.

Figure 4:
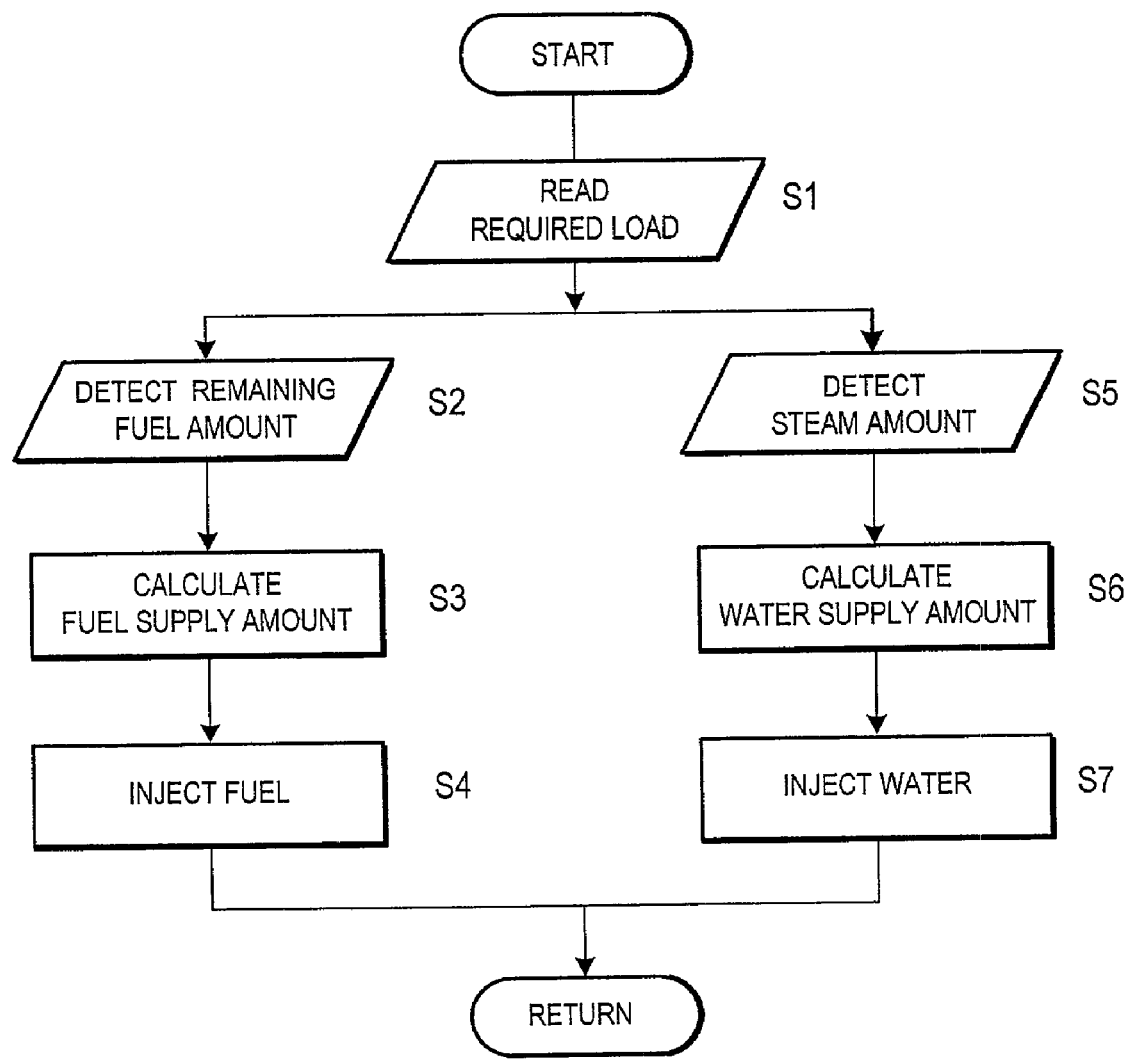
FIG. 4 is a flowchart showing a fuel and water supply amount control routine according to the third embodiment.

FIG. 4 shows the details of the fuel and water supply amount control, and is periodically executed by the controller 30.

In a step S1, a required load of the fuel cell 9 is calculated from an accelerator pedal depression amount due to the driver and the vehicle speed. The accelerator pedal depression amount can be calculated from the output of an accelerator pedal depression sensor 31, and vehicle speed can be calculated from the output of a vehicle speed sensor 32.

In steps S2, S5, a remaining fuel amount and a steam amount in the circulated anode exhaust gas are detected respectively from a signal from the fuel component sensor 19 and the steam flowrate sensor 18.

Figure 5:
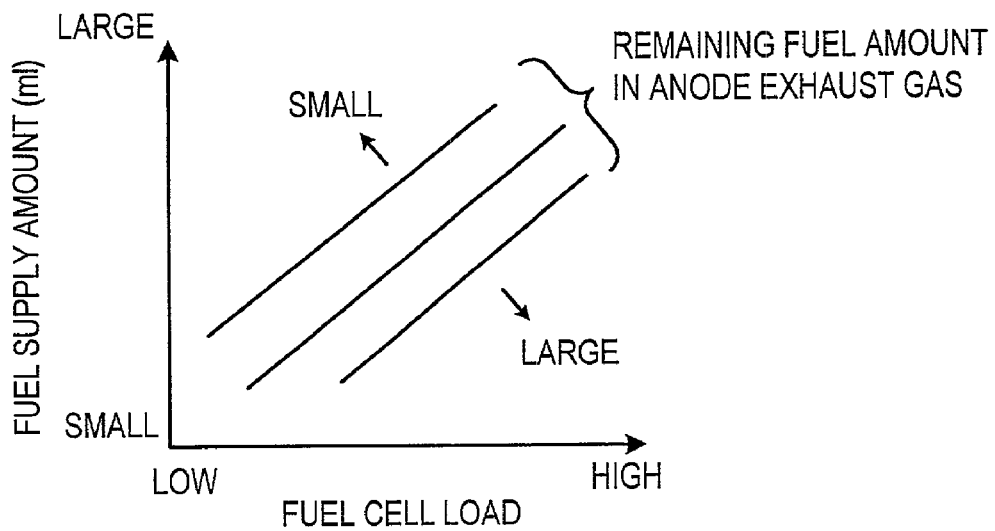
FIG. 5 is an example of a fuel supply amount map according to the third embodiment.
Figure 6:
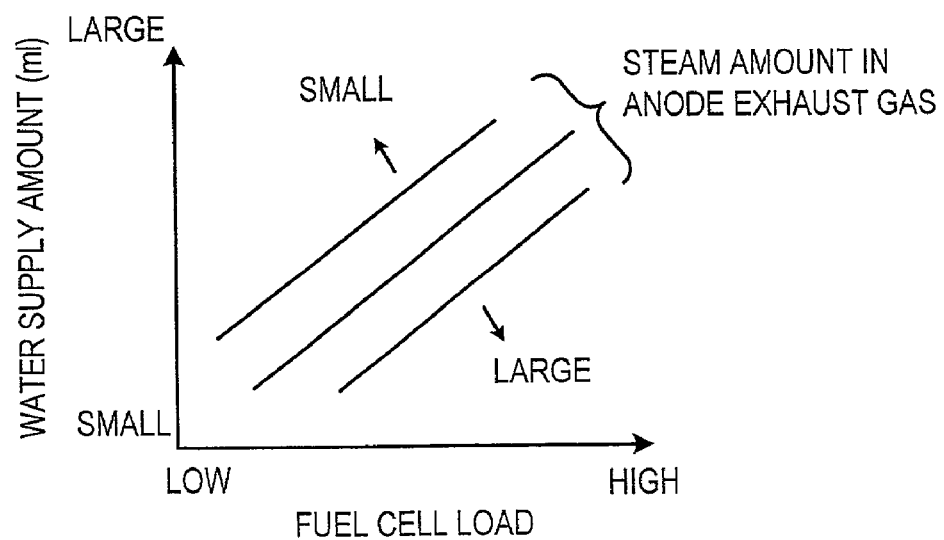
FIG. 6 is an example of a water supply amount map according to the third embodiment.

In steps S3, S6, the fuel supply amount is calculated by looking up a preset map shown in FIG. 5 from the required load and detected remaining fuel amount, and the water supply amount is calculated by looking up a preset map shown in FIG. 6 from the required load and detected steam amount.

In steps S4, S7, the fuel amount and water supply amount which were looked up are respectively injected from the injector 3 and injector 22.

In this embodiment, a water feeder was added to the construction of the first embodiment, but an identical water feeder may also be added to the construction of the second embodiment.

Figure 7:
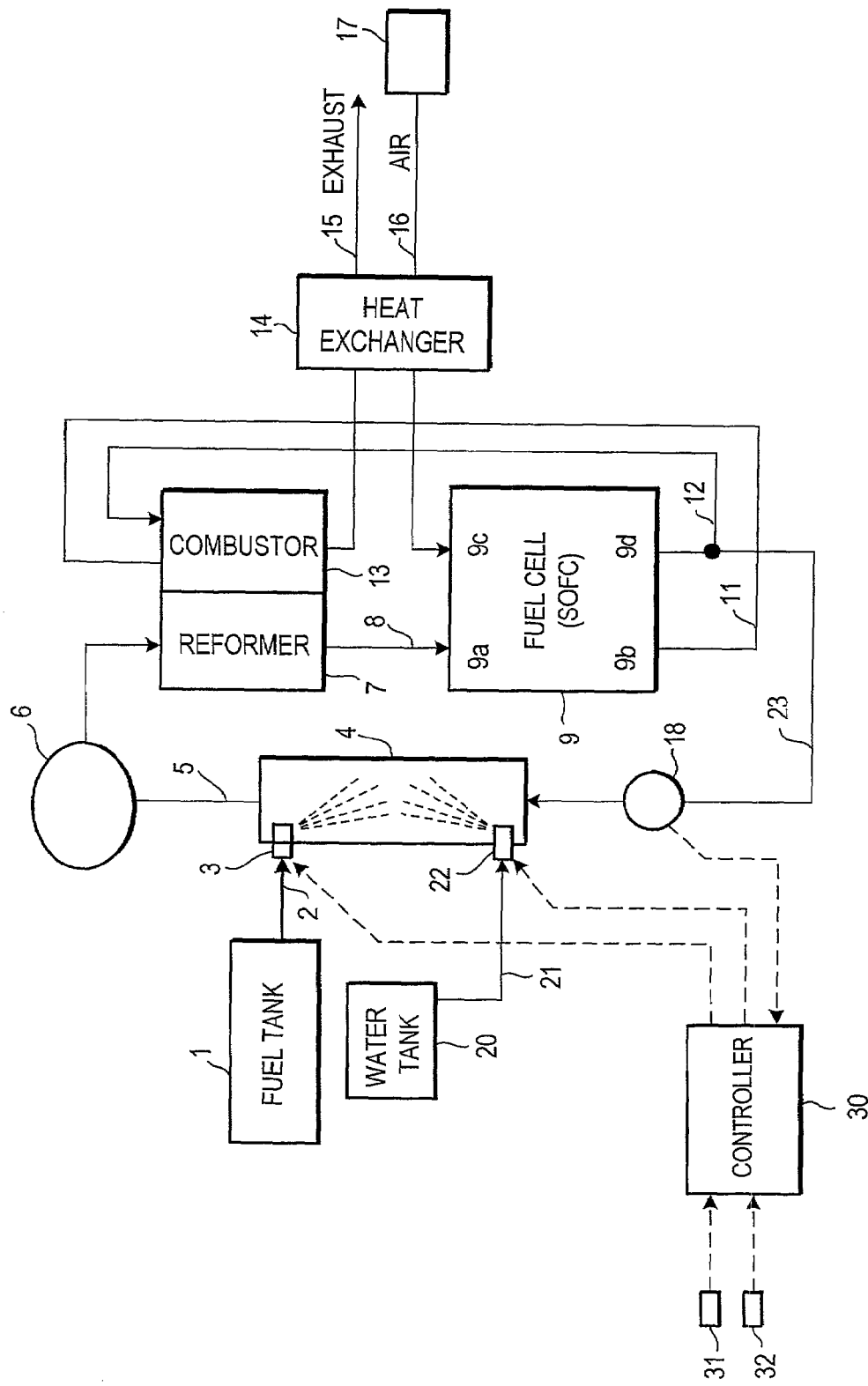
FIG. 7 is similar to FIG. 1, but showing a fourth embodiment of this invention.

FIG. 7 shows a fourth embodiment of this invention.

In this embodiment, the fuel cell 9 is a proton conduction solid oxide fuel cell which uses hydrogen or a hydrocarbon as fuel, and it circulates hot exhaust gas which is discharged from the cathode. Specifically, a hydrocarbon liquid fuel such as gasoline is used as fuel, and part of the cathode exhaust gas after power generation by the fuel cell 9 is circulated to the anode inlet 9*a* via the vaporizer 4. An identical water feeder to that of the third embodiment is also provided.

Specifically, part of the cathode exhaust gas is supplied to the vaporizer 4 via a cathode exhaust gas circulating passage 23 from the cathode outlet 9*d*, and in the vaporizer 4, fuel injected from the injector 3, water injected from the injector 22 and cathode exhaust gas are mixed. The cathode exhaust gas from this proton conduction solid oxide fuel cell is at high temperature, so vaporization of fuel and water occur rapidly. Some of the heat of the cathode exhaust gas is taken up when the injected water vaporizes, but not so much as to prevent vaporization of the injected fuel.

The mixed fuel gas which was mixed in the vaporizer 4 is supplied to the reformer 7 via the fuel gas supply passage 5 and circulation blower 6. The mixed fuel gas has a lower temperature than that of the circulated cathode exhaust gas due to vaporization of fuel and water, so high temperature fuel or steam do not flow through the circulation blower 6. The fuel gas reformed in the reformer 7 is supplied to the anode inlet port 9a via the fuel gas supply passage 8 for power generation, and is discharged from the fuel cell outlet 9b as anode exhaust gas.

The air supplied from the air feeder 17 via the air passage 16 is heated by heat exchange with the exhaust gas 15 from the combustor 13 in the heat exchanger 14 for preheating, and is supplied to the cathode inlet 9c of the fuel cell 9 for power generation. The air which was not used is discharged from the cathode outlet 9d. Part of the cathode exhaust gas discharged from the cathode outlet 9d is supplied to the vaporizer 4 via the cathode exhaust gas circulation passage 23. The remainder is supplied to the combustor 13 via the cathode exhaust gas passage 12, burnt together with the anode exhaust gas supplied to the combustor 13 via the anode exhaust gas passage 11, and discharged as exhaust gas.

Figure 8:
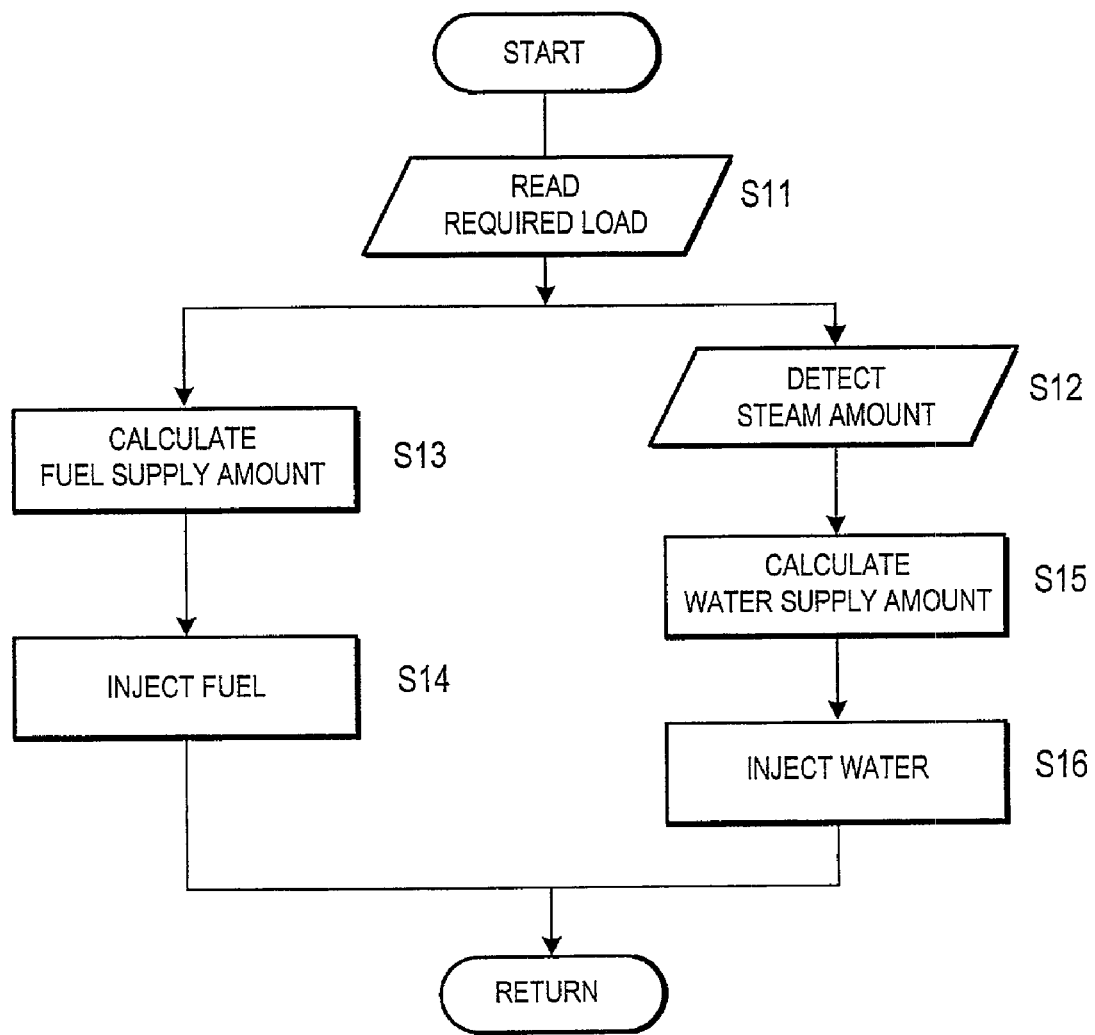
FIG. 8 is a flowchart showing a fuel and water supply amount control routine according to the fourth embodiment.

FIG. 8 is a flowchart of fuel and water supply amount control, and is periodically executed by the controller 30. According to this control, the fuel supply amount is open loop controlled based on the running load. At the same time, the water supply amount is feedback controlled to an optimum amount based on a signal from the steam flowrate sensor 18.

In a step S11, the required load for the fuel cell 9 is calculated from the accelerator depression amount due to the driver and the vehicle speed.

In a step S12, the steam amount in the circulated cathode exhaust gas is detected by a signal from the steam flowrate sensor 18.

Figure 9:
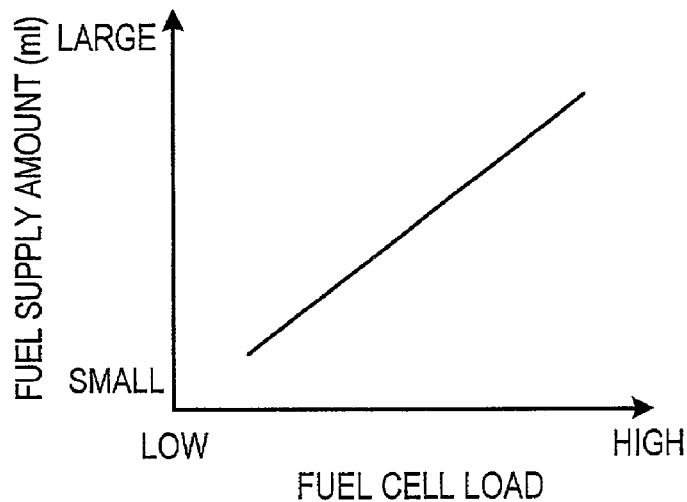
FIG. 9 is an example of a fuel supply amount map according to the fourth embodiment.
Figure 10:
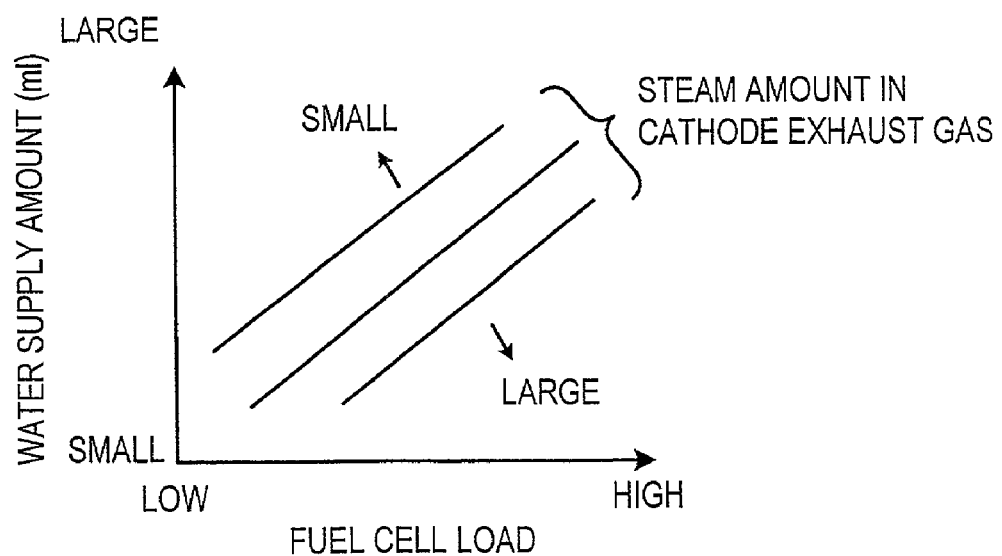
FIG. 10 is an example of a water supply amount map according to the fourth embodiment.

In the steps S13, S15, the fuel supply amount is calculated by looking up a preset map shown in FIG. 9 based on the required load, and the water supply amount is calculated by looking up a preset map shown in FIG. 10 based on the detected steam amount.

In the steps S14, S16, the detected fuel amount and steam amount are respectively injected from the injector 3 and injector 22.

According to this embodiment, the reformer 7 was installed outside the fuel cell, but a construction wherein cathode exhaust gas is circulated to the fuel cell 9 via the vaporizer 4 may also be applied to an internal reforming type fuel cell system wherein fuel reforming is performed inside the fuel cell 9, as in the second embodiment. In an internal reforming type fuel cell system which has a high running temperature, hot exhaust gas is obtained, and in a proton conduction fuel cell where cathode exhaust gas is circulated, this is an advantage from the viewpoint of vaporizing fuel and water.

This invention is not limited to the oxygen ion conduction type Solid Oxide Fuel Cell (SOFC) and can be applied to a fuel cell which has high temperature exhaust gas. For example, this invention can also be applied to the Molten Carbonate Fuel Cell (MCFC) wherein the anode exhaust gas includes water and its temperature reaches as high as 600–700° C.

The reformer 7 may be a steam reforming type or a partial oxidation type.

In the above embodiments, the heat of the combustor 13 was used to compensate for the decrease in temperature of the reformer 7 and to heat the supply air, but the heat source is not limited to this, and a heat source which heats the outside of the reformer by a burner or the like, or maintains the temperature of the fuel cell, may be provided separately.

The entire contents of Japanese Patent Application P2001-44676 (filed Feb. 21, 2001) are incorporated herein by reference.

Although the invention has been described above by reference to a certain embodiment of the invention, the invention is not limited to the embodiment described above. Modifications and variations of the embodiments described above will occur to those skilled in the art, in the light of the above teachings. The scope of the invention is defined with reference to the following claims.

What is claimed is:

1. A fuel cell system, comprising:
   a fuel cell,
   an exhaust gas circulation passage which circulates part of an exhaust gas from the fuel cell back to the fuel cell,
   a vaporizer arranged in the exhaust gas circulation passage, and
   a fuel injection mechanism which injects liquid fuel into the circulated exhaust gas in the vaporizer, the vaporizer vaporizing the injected fuel;
   a sensor which detects a fuel amount in the circulated exhaust gas upstream from the fuel injection mechanism, and
   a controller which functions to control the fuel injection amount from the fuel injection mechanism according to the detected fuel amount.

2. The fuel cell system as defined in claim 1, further comprising:
   a circulation blower which is provided downstream to the vaporizer and blows the circulated exhaust gas under pressure.

3. The fuel cell system as defined in claim 1, further comprising:
   a water feeder which supplies water to the circulated exhaust gas.

4. The fuel cell system as defined in claim 3, wherein:
   the water feeder comprises a water injection mechanism which injects water into the circulated exhaust gas.

5. The fuel cell system as defined in claim 4, wherein:
   the water feeder is installed on the vaporizer.

6. The fuel cell system as defined in claim 5, wherein:
   the water injection mechanism is installed upstream from the fuel injection mechanism.

7. The fuel cell system as defined in claim 3, further comprising:
   a sensor which detects the steam amount in the circulated exhaust gas upstream from the water feeder, and
   a controller which functions to control the water supply amount from the water feeder according to the detected steam amount.

8. The fuel cell system as defined in claim 1, wherein:
   the fuel cell is a solid oxide fuel cell.

9. The fuel cell system as defined in claim 8, wherein:
   the exhaust gas circulation passage circulates the anode exhaust gas of the fuel cell.

10. The fuel cell system as defined in claim 8, wherein:
    the exhaust gas circulation passage circulates the cathode exhaust gas of the fuel cell.

11. The fuel cell system as defined in claim 1, further comprising:
    a reformer which reforms fuel gas upstream from the fuel cell.

12. The fuel cell system as defined in claim 1, wherein:
    the fuel cell performs an internal fuel reforming.

* * * * *